(12) United States Patent
Struhl et al.

(10) Patent No.: US 10,856,531 B2
(45) Date of Patent: Dec. 8, 2020

(54) BEE HIVE BOTTOM BOARD SYSTEM WITH AN 8-FRAME ADAPTER AND ROBBING SCREEN

(71) Applicants: Clifford Struhl, Syosset, NY (US); Raymond M. Schneider, Port Washington, NY (US)

(72) Inventors: Clifford Struhl, Syosset, NY (US); Raymond M. Schneider, Port Washington, NY (US)

(73) Assignee: Clifford Struhl, Syosset, NY (US)

( * ) Notice: Subject to any disclaimer, the term of this patent is extended or adjusted under 35 U.S.C. 154(b) by 259 days.

(21) Appl. No.: 15/940,112

(22) Filed: Mar. 29, 2018

(65) Prior Publication Data

US 2018/0279585 A1  Oct. 4, 2018

Related U.S. Application Data

(60) Provisional application No. 62/478,726, filed on Mar. 30, 2017.

(51) Int. Cl.
*A01K 47/06* (2006.01)
*A01K 47/02* (2006.01)
*A01M 29/30* (2011.01)

(52) U.S. Cl.
CPC .............. *A01K 47/06* (2013.01); *A01K 47/02* (2013.01); *A01M 29/30* (2013.01)

(58) Field of Classification Search
CPC ........ A01K 47/00; A01K 47/02; A01K 47/04; A01K 47/06

(Continued)

(56) References Cited

U.S. PATENT DOCUMENTS 852,907 A * 5/1907 Saffell ................... A01K 47/06
449/21
1,468,995 A * 9/1923 Cottam .................. A01K 47/06
449/25

(Continued)

FOREIGN PATENT DOCUMENTS

WO   WO-2012011881 A2 *  1/2012  ............. A01K 47/06

OTHER PUBLICATIONS

Margaret Groot, "Robbing Screen—How to and Why—Wasp and Robbing Honey Bees—AFB?," kiwimana, published Feb. 11, 2016; available at https://web.archive.org/web/20160328114732/https://www.kiwimana.co.nz/robbing-screen-wasp-and-robbing-honey-bees-afb/ (Year: 2016).*

*Primary Examiner* — Lisa L Tsang
(74) *Attorney, Agent, or Firm* — Dilworth & Barrese, LLP.; Michael J. Musella, Esq.

(57) ABSTRACT

A bee hive bottom board system for receiving a hive body includes a 3-sided rectangular frame having a right side, a left side and a rear side, each side having a top surface and an inner surface, the top surface defining a frame plane; a drain edge positioned within the frame about the inner surface, the drain edge having a top surface defining a drain edge plane set below the frame plane; and two adapters having a support component and a flange component, the flange component of each adapter positionable along the inner surface of one of the right side and left side of the frame and mateable with the upper surface of one of the right side and left side of the frame. When mated with the frame, a top surface of the adapter is substantially flush with the top surface of the frame.

17 Claims, 13 Drawing Sheets

(58) Field of Classification Search
USPC .................. 449/3, 13, 20, 22, 24, 25, 26, 50
See application file for complete search history.

(56) References Cited

U.S. PATENT DOCUMENTS

| | | | | |
|---|---|---|---|---|
| 2,140,964 | A * | 12/1938 | Meyer | A01K 47/06 449/13 |
| 3,968,531 | A * | 7/1976 | Cartwright | A01K 47/00 449/30 |
| 4,517,694 | A * | 5/1985 | Hong | A01K 47/06 449/19 |
| 4,594,744 | A * | 6/1986 | Ferrari | A01K 47/06 449/19 |
| 2011/0306272 | A1* | 12/2011 | Ferguson | A01K 47/06 449/25 |
| 2016/0227745 | A1* | 8/2016 | Reed | A01K 47/02 |
| 2017/0135323 | A1* | 5/2017 | Gerogiannis | A01K 47/00 |

* cited by examiner

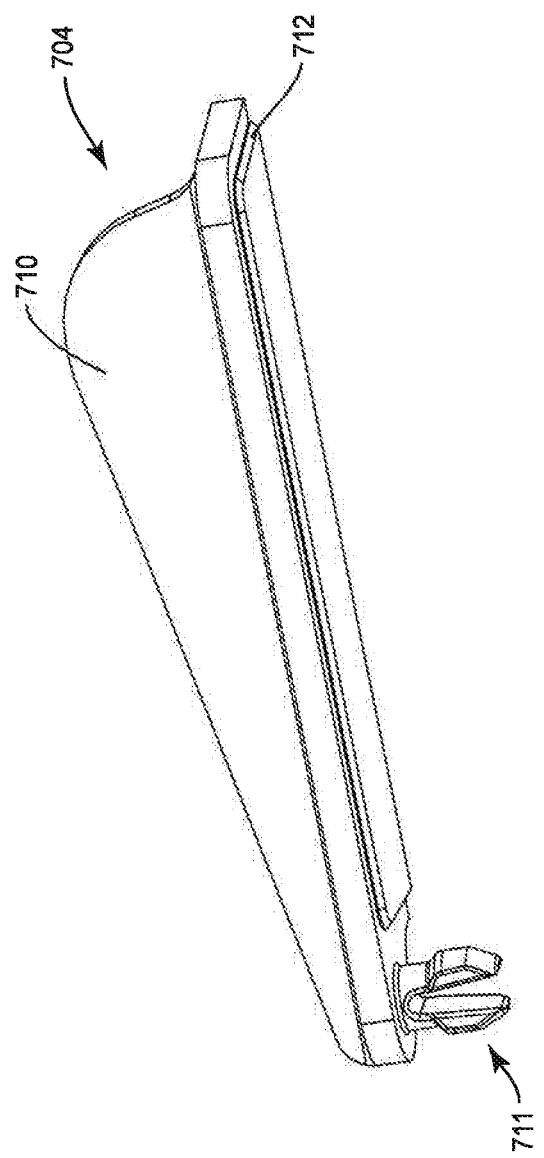

BEE HIVE BOTTOM BOARD SYSTEM WITH AN 8-FRAME ADAPTER AND ROBBING SCREEN

REFERENCE TO PRIOR APPLICATION(S)

This application claims priority to U.S. Provisional Application No. 62/478,726, filed Mar. 30, 2017, the entire contents of which are incorporated herein by reference.

TECHNICAL FIELD

The present disclosure relates generally to bee hives and components thereof, and more particularly, to a bee hive bottom board system with an 8-frame adapter and robbing screen.

BACKGROUND OF THE INVENTION

The bottom board is an essential component of all standard bee hives that consist of stacked boxes that contain hive frames which in turn contain brood boxes with eggs, larvae, pupae and house bees along with boxes (supers) that contain stored honey. The bottom board supports the entire hive and most contain a screen in the center to allow for ventilation and debris plus mites to fall though, along with a removable board that can be used for mite management or ventilation control. Some bee hives also have components to control the size of the front entrance.

Most bottom boards are made from wood and wire mesh, and require painting in order to reduce rotting and extend the life thereof. The size of the front opening created by the bottom board can be controlled with the addition of an optional wood bar (entrance reducer) or the addition of a mouse guard to allow bees to move freely while keeping mice out. In addition, a robbing screen can be installed in front to prevent unwanted visitors/invaders.

Prior art bottom boards are typically made from wood and are pieced and hobbled together with nails and glue to add screens, trays, or other attachments. The prior art bottom boards are expensive to make, require long hours to craft and assemble, and require many after-market add on items to provide a full functioning bottom board.

Bee hives typically are sized to fit 10 hive frames. The width of the hive is determined by the number of frames in the hive. A bottom board is typically sized to accommodate a 10-frame hive. A less popular, but common bee hive making up about 20 percent of the bee hive market, is the 8-frame hive. This narrower design requires a bottom board that fits the narrower width of the 8-frame hive. As all of the bottom boards are manufactured to only accommodate either a 10-frame hive or an 8-frame hive, dealers are forced to carry double bottom board inventory.

Robbing screens are simple devices used to control access to a bee hive and limit hive entry to resident bees by keeping out bees from other hives (drifting) or robbers trying to steal resources, like honey. By controlling the hive entrance, the transmission of mites, combined with the bee viruses they carry, is minimized and the hives require fewer treatments since the hive is not being continually re-infected. With an effective robbing screen, mites in weak hives cannot hitch rides on other bees to be carried back to their hive(s) and bees with phoretic mites from infected hives cannot bring their mites into the protected hive(s).

Existing robbing screens are fabricated from pieces of wood, wire mesh, sheet metal nailed/stapled together and include openings and or doors over the openings held in with screws. Robbing screens work on the fact that bees are attracted to the hive odor at the entrance and by providing an alternative, higher entrance, invaders will not be able to find a way in, while resident bees can come and go as they please.

Accordingly, it is desirable to provide an improved bee hive bottom board system with an 8-frame adapter and robbing screen that overcomes deficiencies in the prior art.

SUMMARY OF THE INVENTION

Generally speaking, in accordance with the invention, an improved bee hive bottom board system with an 8-frame adapter and robbing screen is provided.

In one embodiment of the invention, a bee hive bottom board system for receiving a hive body having an inside length and inside width, includes: a 3-sided rectangular frame having a right side, a left side and a rear side, defining a right rear inside corner and a left rear inside corner, each side having a top surface and an inner surface, the top surface defining a frame plane; a drain edge positioned within the frame about the inner surface, the drain edge having a top surface defining a drain edge plane set below the frame plane; a first security pin positioned approximate to one of the right rear inside corner and the left rear inside corner, said first security pin extending above the top surface of the frame; and a second security pin positioned diagonally across the frame from the first security pin and at a distance from an inside corner approximately equal to an inside length of the hive box, said second security pin extending above the top surface of the frame, wherein the hive body is positionable on at least a portion of the top surface of the frame and inside and opposite corners of the hive body mate with the security pins.

In another embodiment of the invention, a bee hive bottom board system for receiving a hive body having an inside length and inside width, includes: a 3-sided rectangular frame having a right side, a left side and a rear side, defining a right rear inside corner and a left rear inside corner, each side having a top surface and an inner surface, the top surface defining a frame plane; a drain edge positioned within the frame about the inner surface, the drain edge having a top surface defining a drain edge plane set below the frame plane; and two adapters having a support component and a flange component, the flange component of each adapter positionable along the inner surface of one of the right side and left side of the frame and mateable with the upper surface of one of the right side and left side of the frame, wherein when mated with the frame, a top surface of the adapter is substantially flush with the top surface of the frame, and wherein hive body is positionable on at least a portion of the top surface of the adapter.

In yet another embodiment of the invention, a bee hive bottom board system for receiving a hive body having an inside length and inside width, includes: a 3-sided rectangular frame having a right side, a left side and a rear side, defining a right rear inside corner and a left rear inside corner, each side having a top surface and an inner surface, the top surface defining a frame plane; a drain edge positioned within the frame about the inner surface, the drain edge having a top surface defining a drain edge plane set below the frame plane; and a robbing screen positionable across a front edge of the drain edge and within the inside of the frame, the robbing screen comprising: a mounting edge defining a first plane; a front surface defining a second plane substantially parallel to the first plane; a connecting edge connecting the mounting edge and the front surface, said connecting edge defining a plane substantially perpendicular to the first and second planes, said connecting edge defining at least one hive access port positioned on an upper surface of the connecting edge; and an access port door having a connector component for rotatably connecting the access port door to the connecting edge and configured to open and close access to the hive through the access port.

Other embodiments of the invention will be apparent from the drawings and the specification to follow and the scope of the invention will be indicated in the claims.

BRIEF DESCRIPTION OF THE DRAWINGS

The present disclosure will become more readily apparent from the specific description accompanied by the following drawings, in which:

FIG. 7B is a bottom perspective view of a robbing screen door according to an embodiment of the present disclosure;

Throughout the disclosure, like reference numerals will be used to indicate similar elements.

DETAILED DESCRIPTION OF THE PREFERRED EMBODIMENTS

The present disclosure may be understood more readily by reference to the following detailed description, taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments, by way of example only, and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. In particular, they are intended to refer to the spatial reference of the display stand in its normal, assembled configuration during intended use.

The bee hive system according to the present disclosure will now be described with respect to the drawings.

Figure 11:
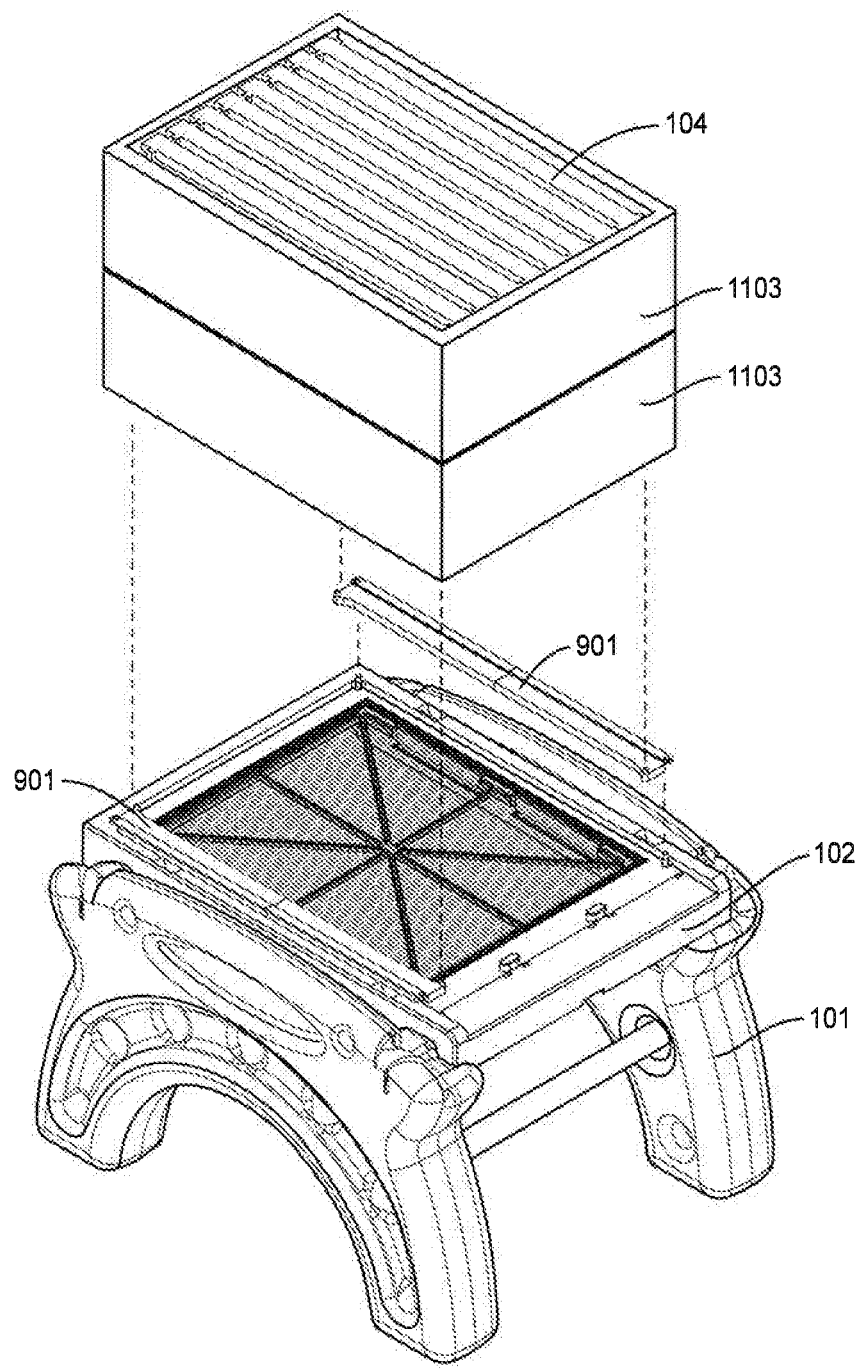
FIG. 11 is a top expanded perspective view of a bee hive with a bottom board system and adapters according to an embodiment of the present disclosure.

A bee hive system 100 typically includes a stand 101, a bottom board 102, and hive bodies 103. Hive bodies 103 are designed to typically accept hive frames 104. A hive body that can fit 10 hive frames 104 is referred to as a 10-frame design; a hive body that can fit 8 hive frames 104 is referred to as an 8-frame design (see FIG. 11).

Typical outside dimensions of hive bodies 103 vary depending on the materials from which they are manufactured. Inside dimensions are somewhat standardized to properly accept 10 or 8 hive frames 104. The standard inside dimensions of a 10-frame hive body 103 is 18⅜ inches by 14¼ inches; and, the standard inside dimensions of an 8-frame hive body 1103 is 18⅜ inches by 12¼ inches. Other hive body dimensions are contemplated.

Bottom board 102 is preferably formed as a single unit, although a component structure can be implemented. Bottom board 102 includes a frame 201, a self-draining edge 202, and a screen 203. Frame 201 extends along 3 edges (left side, right side, and rear) of bottom board 102. Screen supports 209 can be included to provide support for screen 203. The front of bottom board 102 remains open for the bees to enter and exit the hive.

An upper surface of frame 201 is used to support hive bodies 103 when assembled on bottom hoard 102. Hive supports 205 are positioned on the front end of self-draining edge 202. Hive supports 205 extend upward from self-draining edge 202 and end at the same plane formed by the upper surface of frame 201. Hive supports 205 support the front of hive bodies 103 when assembled on bottom board 102. Near the front of bottom board 102, drain edge 202 angles downward to form a landing board 210, designed to assist in drainage and provide an angled surface on which bees can land.

Positioned at the corners of frame 201 where the rear side meets each of the right and left sides is a security pin 204. Another security pin 204 is positioned along each of right side and left side and near the front of frame 201. Security pins 204 are space to the dimensions of a 10-frame hive body 103 such that one of security pins 204 is positioned in each of the 4 inside corners of hive box 103 when hive box 103 is assembled on bottom board 102. Security pins 204 keep hive box 103 from moving in any horizontal direction. Hive strap notches 301 are positioned on a bottom edge and along each side of frame 201 and one at the front of bottom board 102 to accept hive straps (not shown) to secure around bottom board 102 and hive bodies 103 when assembled to prevent any unwanted movement between bottom board 102 and hive bodies 103.

Figure 6:
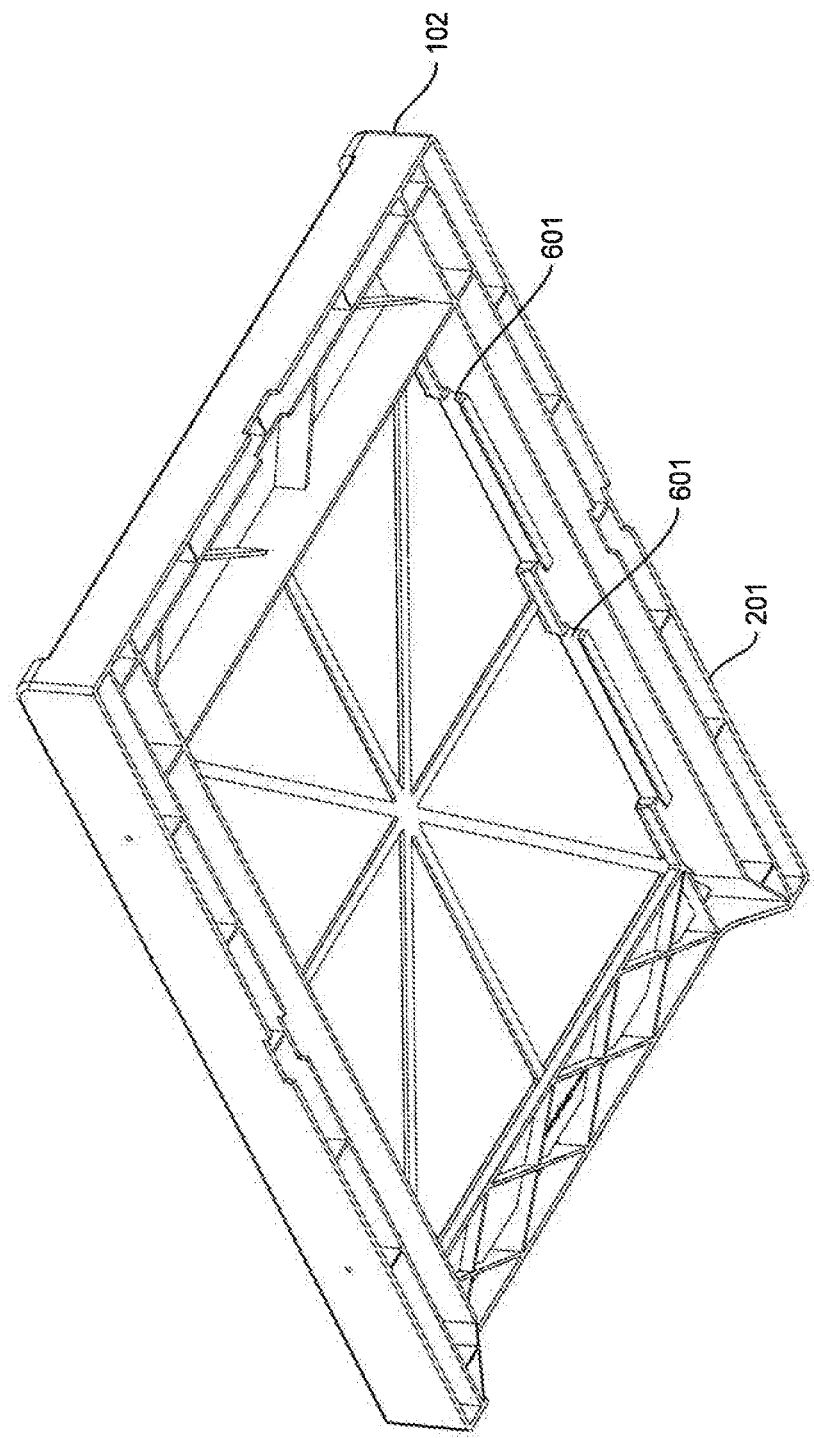
FIG. 6 is a bottom perspective view of a bottom board system according to an embodiment of the present disclosure.
Figure 7:
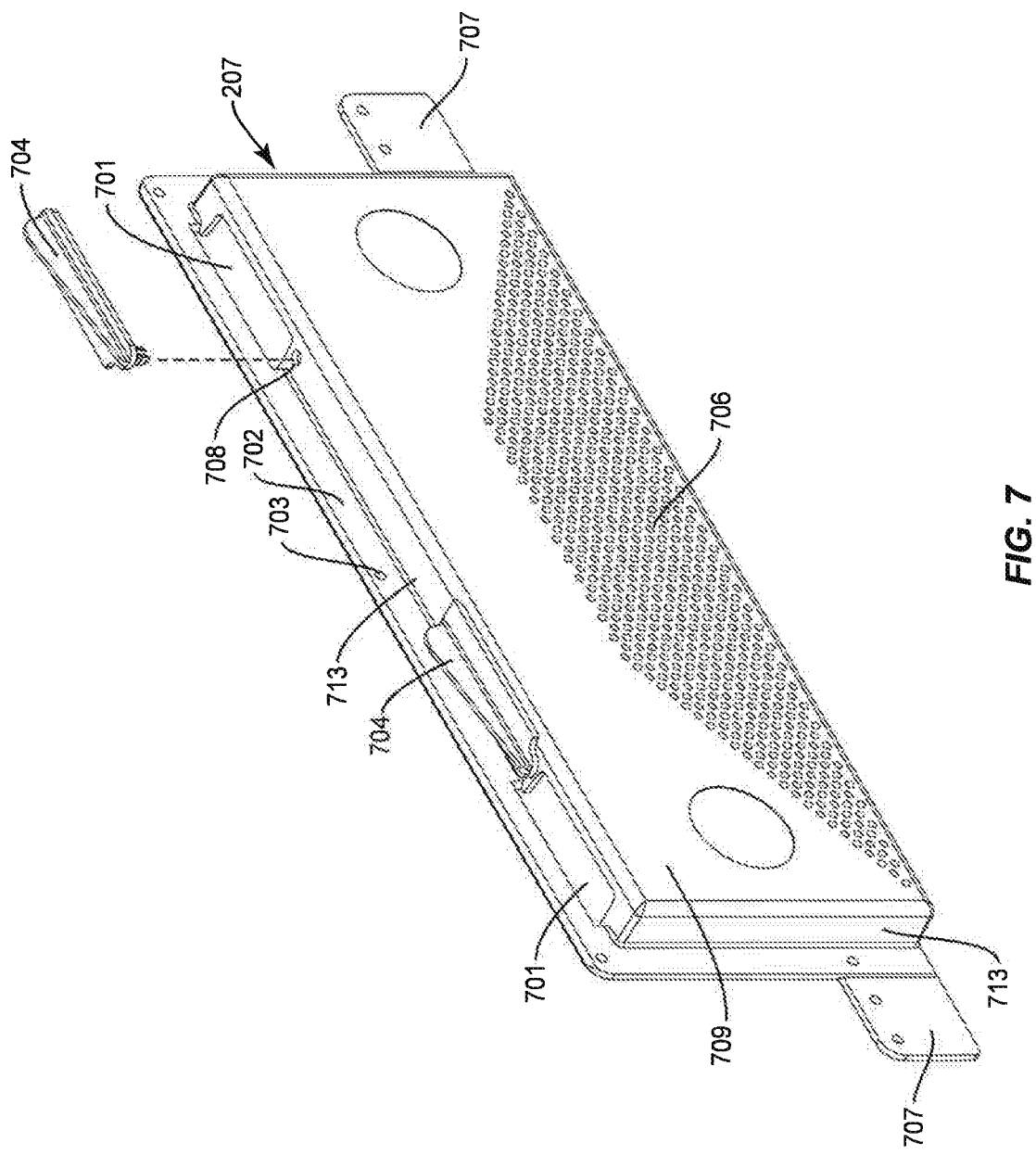
FIG. 7 is a top perspective view of a robbing screen according to an embodiment of the present disclosure.
Figure 7A:
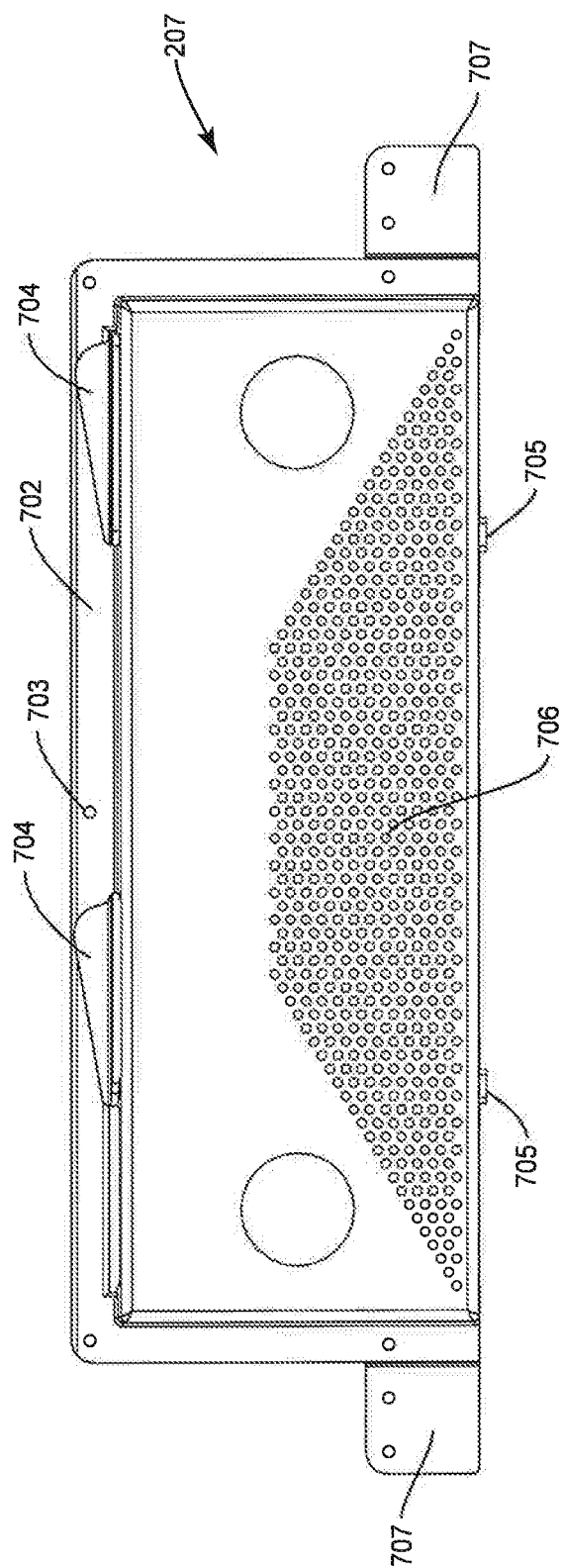
FIG. 7A is a front plan view of a robbing screen according to an embodiment of the present disclosure.
Figure 8:
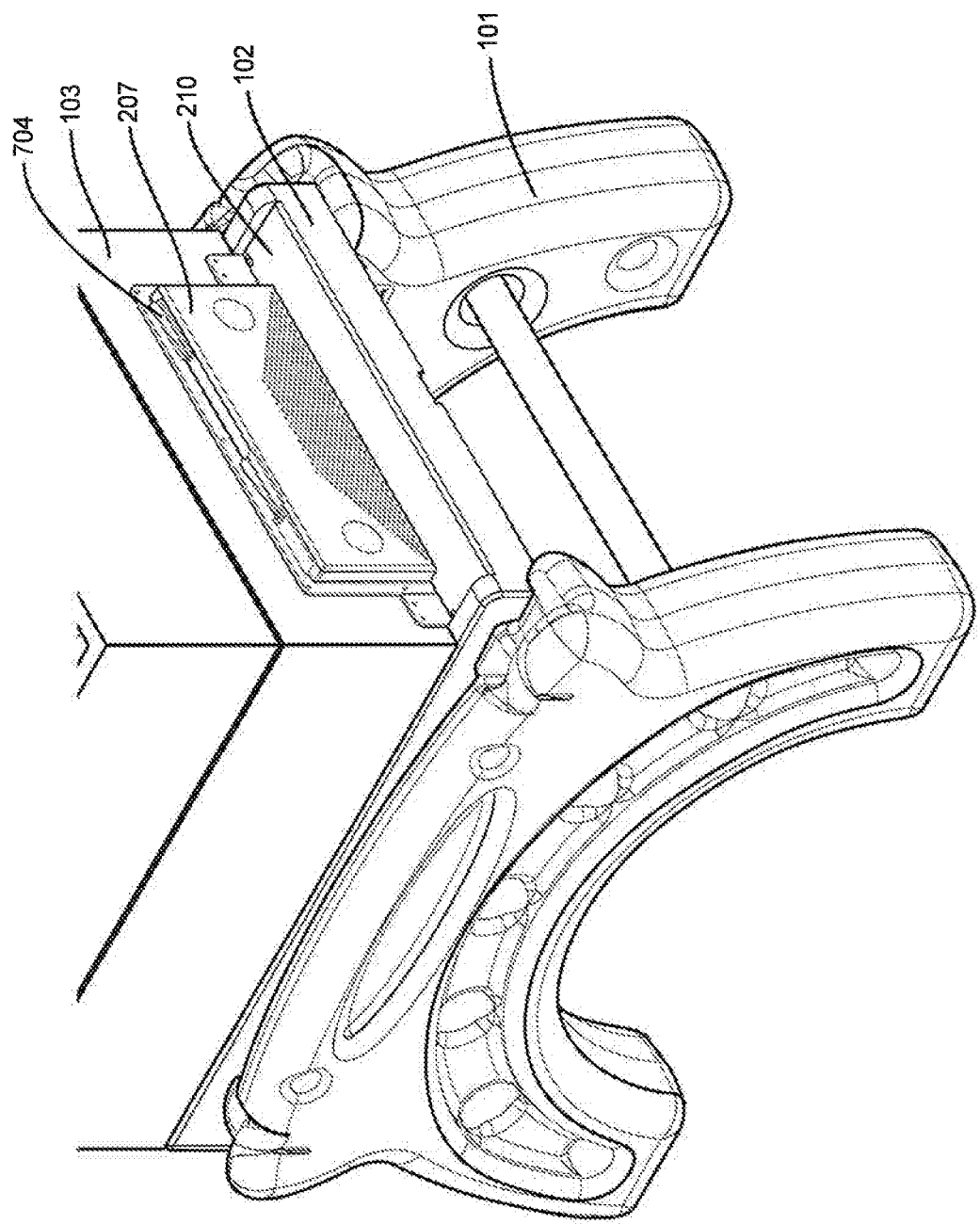
FIG. 8 is a perspective view of a bottom board system with a robbing screen according to an embodiment of the present disclosure.
Figure 9:
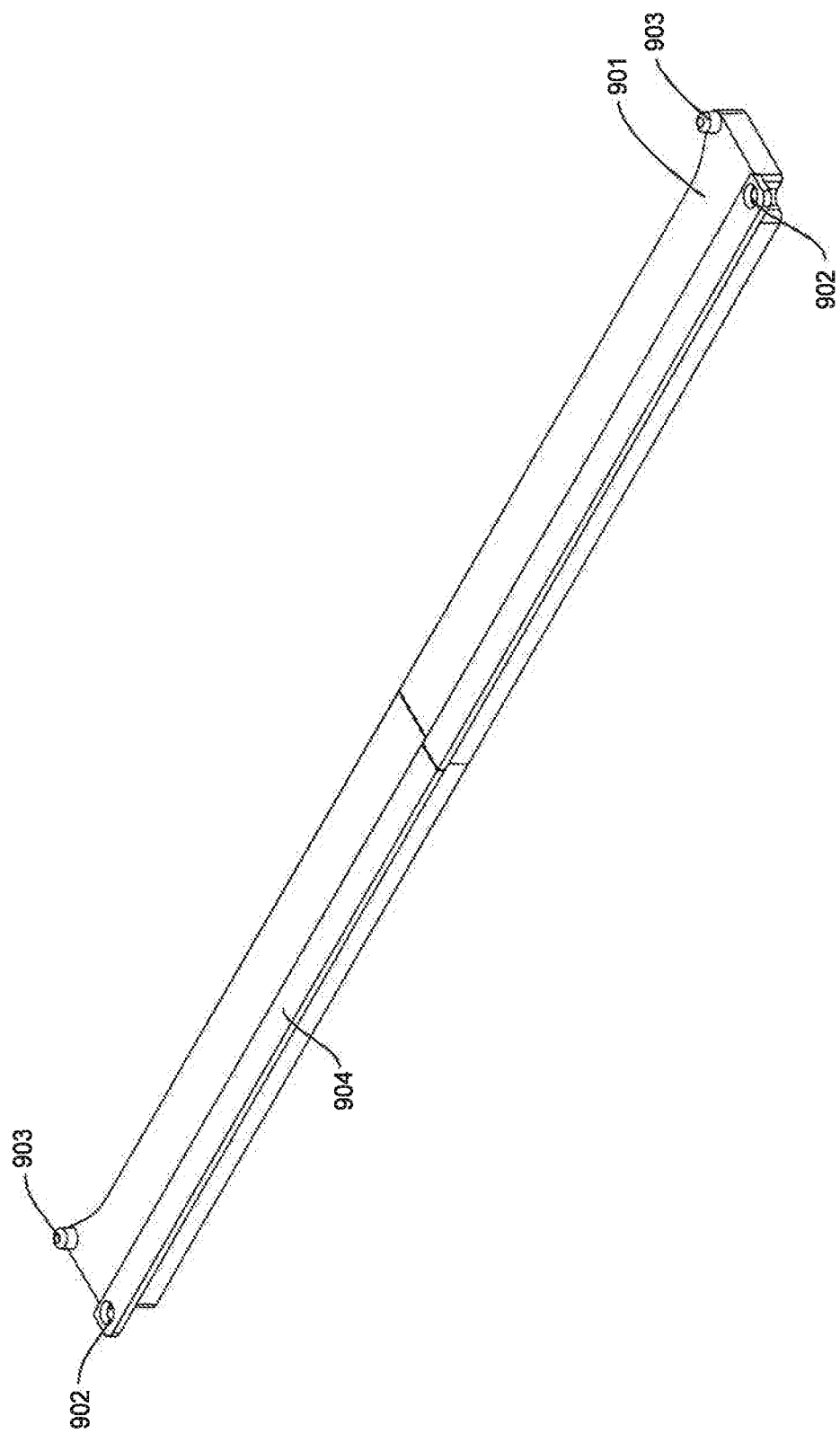
FIG. 9 is a top perspective view of an adapter for a bottom board according to an embodiment of the present disclosure.

An inspection board 208 is also provided. Inspection board 208 is slidably attachable to bottom board 102 via slide supports 601. Slide supports 601 are positioned on the underside of bottom board 102 as shown in FIG. 6. At least one slide support 601 is positioned along each side of frame 201.

Figure 1:
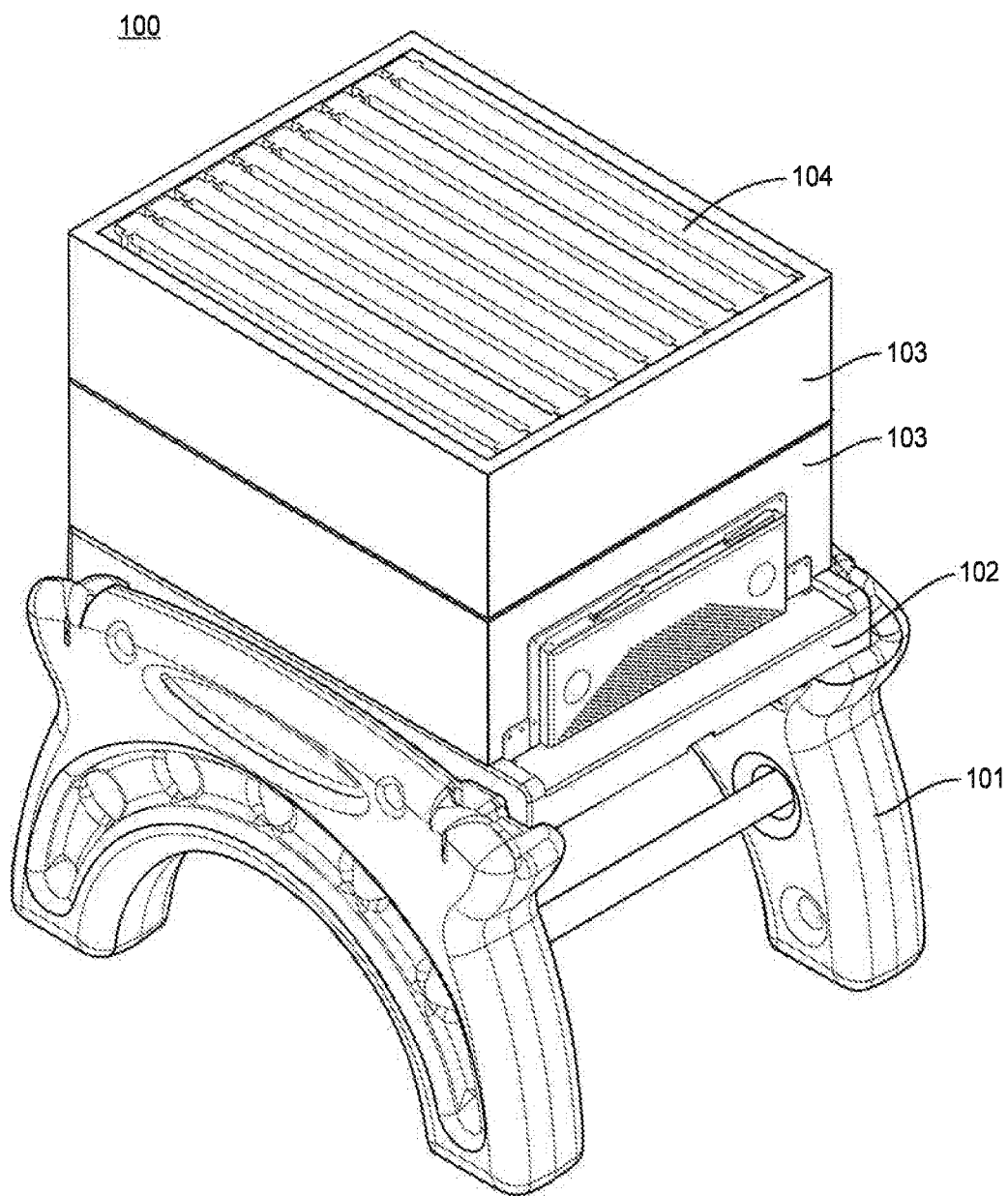
FIG. 1 is a perspective view of a bee hive according to an embodiment of the present disclosure.
Figure 2:
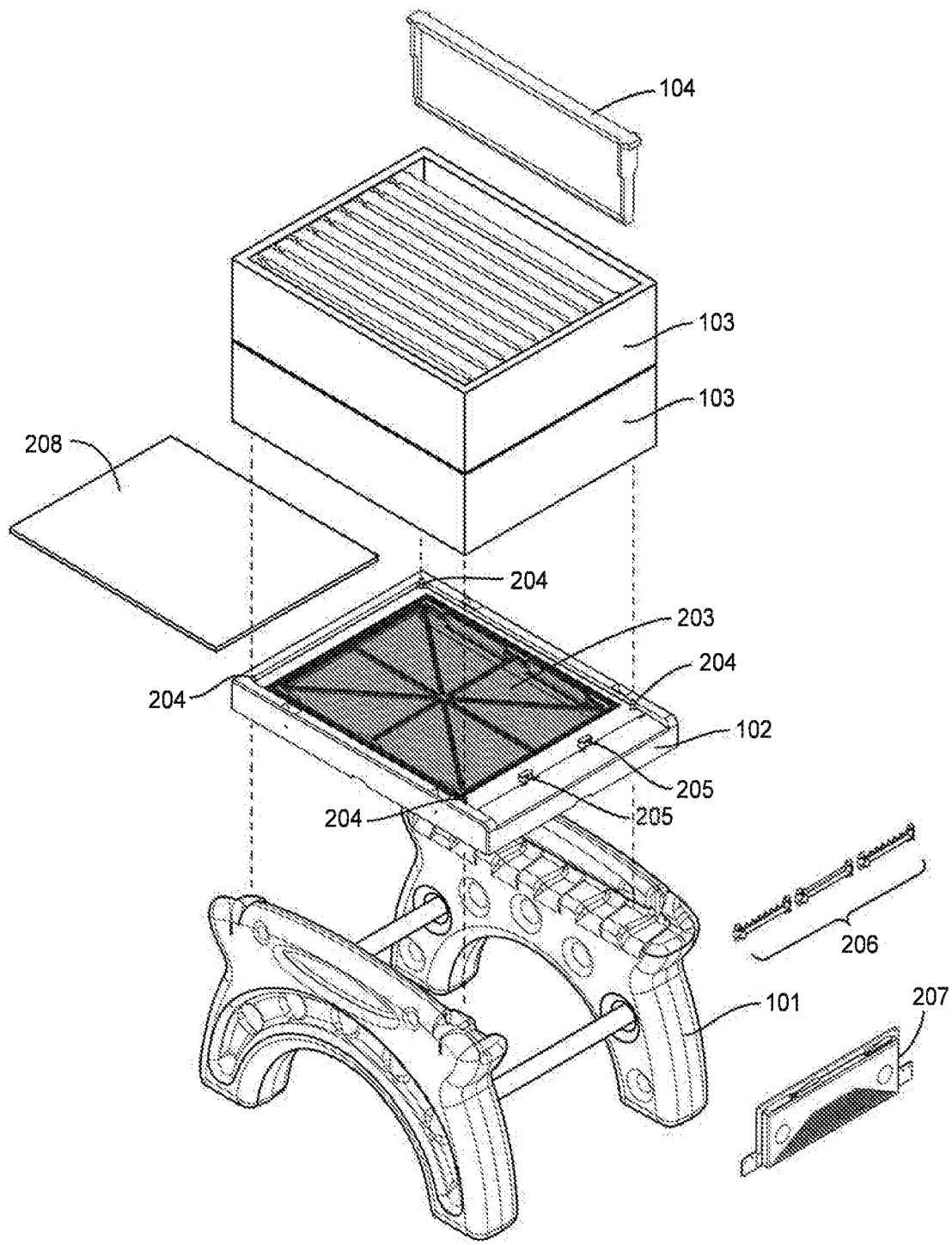
FIG. 2 is an expanded view of a bee hive according to an embodiment of the present disclosure.
Figure 3:
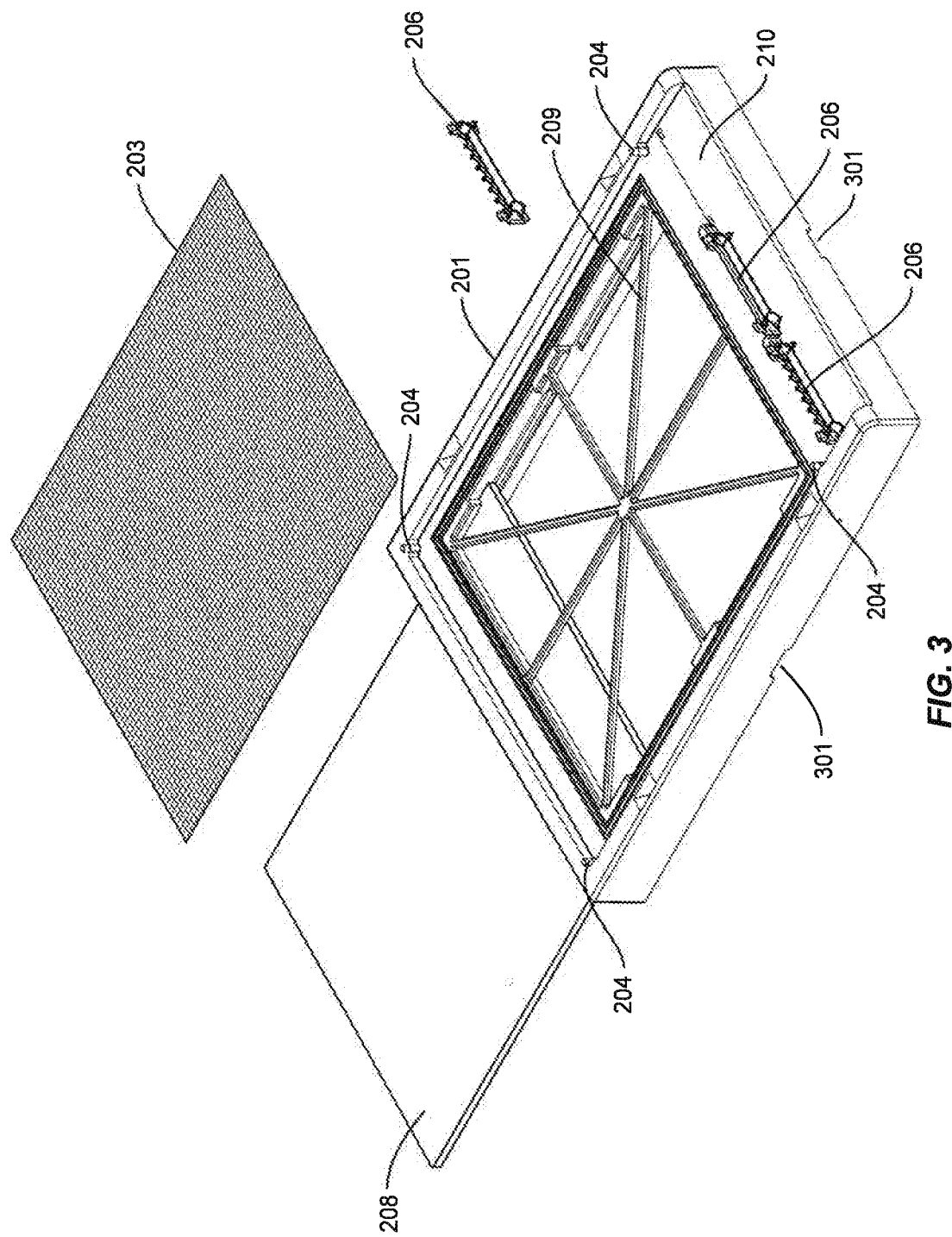
FIG. 3 is a top perspective view of a bottom board system according to an embodiment of the present disclosure.
Figure 4:
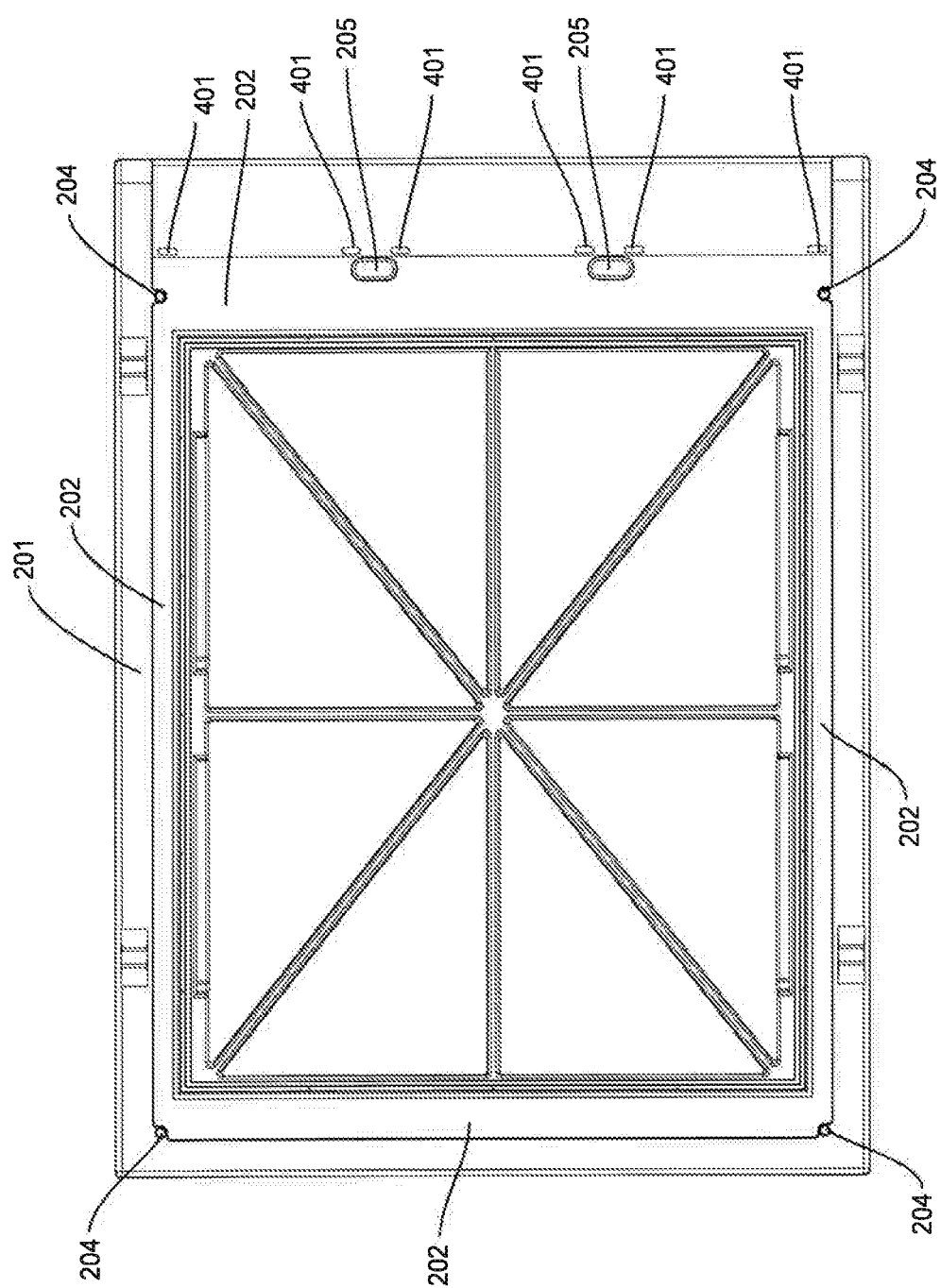
FIG. 4 is a top plan view of a bottom board system according to an embodiment of the present disclosure.
Figure 5:
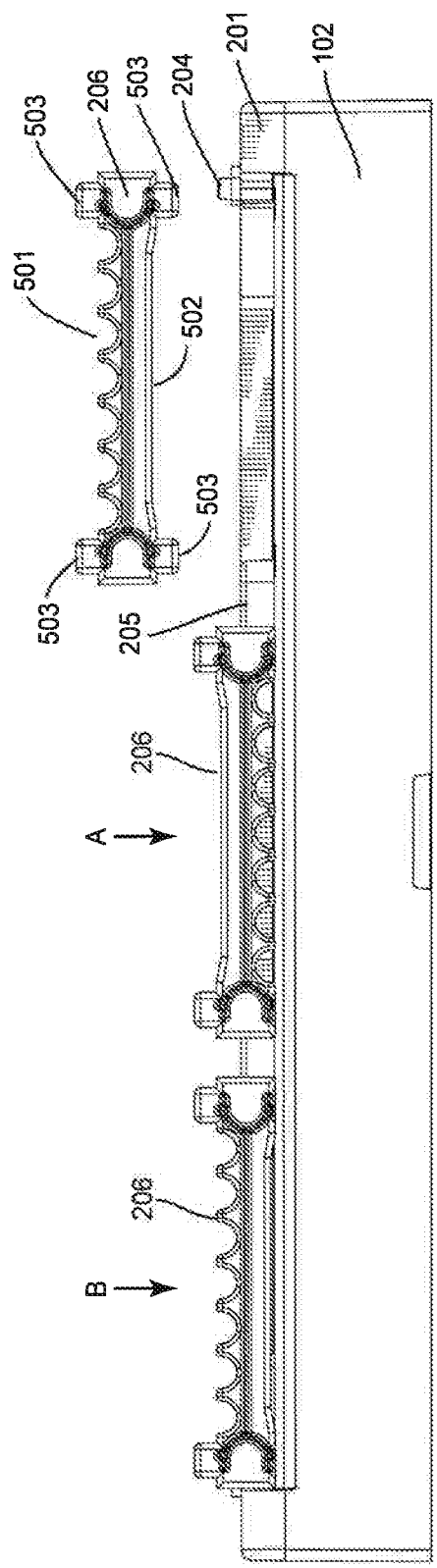
FIG. 5 is a front plan view of a bottom hoard system according to an embodiment of the present disclosure.

In order to control the entry and exit of an assembled bee hive, mouse guards/entrance reducers 206 are provided. Mouse guards 206 are removeable and reversible and attach to bottom board 102. Mouse guards 206 have one side that includes a series of arches 501 and an opposite side that includes a surface slightly offset from a lower edge of mouse guard 206. Each mouse guard 206 include 2 pair of opposite tabs 503 that are designed to mate with slot 401 positioned on bottom board 102. In mouse guard orientation shown as A in FIG. 5, the arches are facing down and create a space just large enough for a bee to enter. In entrance reducer orientation shown as B in FIG. 5, only a small air space is created between the surface slightly offset from the lower edge of mouse guard 206 and the surface of bottom board 102, which permits some ventilation but no access or egress to bees or other creatures.

As an alternative to mouse guards 206, a robbing screen 207 can be used.

Robbing screen 207 secures a bee hive from would-be scavengers and/or invaders and unwanted transmission of mites and/or viruses and/or other diseases. As opposed to the prior art robbing screens, robbing screen 207 offers a better control of the entrance(s) by controlling hive odors through selective openings, a universal one size fits all design, can be used for mite control throughout an apiary, a secure snap together door pivot pin assembly with locking feature, and eliminates the need for mounting screws or hardware by incorporating simple push pins for attachment.

Robbing screen 207 includes at least one opening 701 that can be controlled with a door 704. Door 704 is rotatably attachable to robbing screen 207 via a pivot pin 711 that mates with hole 708. Robbing screen 207 also includes a mounting edge 702 and mounting holes 703 used to attach robbing screen 207 to hive body 103. Robbing screen 207 can also include one or more tabs 705 that mate with slot 401 positioned on bottom board 102.

Air ventilation holes 706 are defined through a front surface 709 of robbing screen 207. Front surface 709 of robbing screen 207 defines a first plane and mounting edge 702 defines a second plane substantially parallel to the first plane. A connecting surface 713, which defines a third plane that is substantially perpendicular to the first and second planes, connects the first and second planes. Opening 701 and hole 708 are positioned on connecting surface 713. Although opening 701 and hole 708 are illustrated positioned on the upper surface of connecting surface 713, opening 701 and hole 708 can be positioned on anywhere on connecting surface 713.

Door 704 includes a surface 712 that extends from the bottom surface of door 704. When in a closed position, surface 712 fits within opening 701 and held in place via tension that is created between pivot pin 711 and connecting surface 713 about hole 708. A handle 710 is also includes on door 704 to aid in opening and closing.

Air ventilation holes 706 are specifically designed to control the hive odor with a selective ventilation hole pattern. Air ventilation holes 706 are positioned away from opening 701, which minimizes the chance of non-hive bees and other invaders from finding the opening 701 as the hive odors will emanate from air ventilation holes 706 rather than the opening 701. Air ventilation holes 706 are smaller than any bee or other invader that is to be kept out of the hive. Air ventilation holes 706 are kept a maximum distance from opening 701 as designs and air needs allow. The patterns and groupings of air ventilation holes 706 can be varied based on the requirements of the hive, for example, 2 groupings of holes can be separated and placed on the lower outside corners of front surface 709; other configurations are contemplated.

Robbing screen 201 can also include removeable wings 707. Generally, the vertical opening for bees to enter and exit the hive between the bottom board and the box is ⅜"-⅝" in height. Wings 707 are designed to cover the side of the hive opening; preferably, wings 707 are 1.2" high. Also, the overall width of robbing screen 207, from mounting edge to mounting edge, is as wide as a standard hive opening of an 8-frame hive. Wings 707 add width to accommodate a 10-frame hive and are removed for an 8-frame hive. When attached to hive body 103 and hive body 103 is placed on bottom board 102, a lower edge of robbing screen 207 spans completely across and substantially contacts with landing board 210, from inside of left side of frame 201 to inside of right side of frame 201. This seals off hive and provides access only through opening 701. Additional bevels can be added for snapping off wings 707, if needed, to accommodate other hive widths if required; more than one wing on each side can be included.

Figure 10:
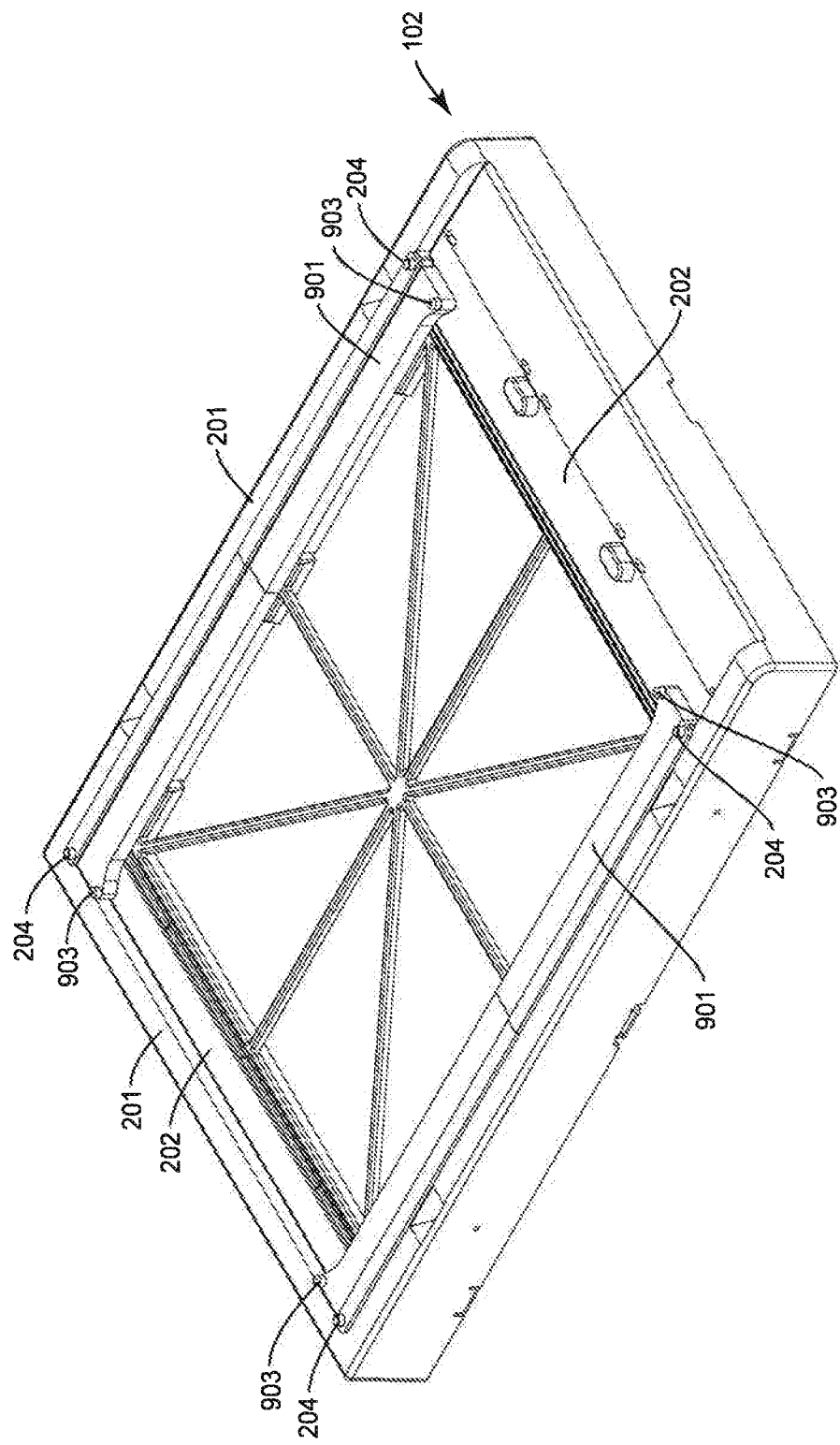
FIG. 10 is a top perspective view of a bottom board with an adapter according to an embodiment of the present disclosure.

In addition to the above features, the above described bottom board 102 can also be adapted to accept an 8-frame hive. An adapter 901 is fitted into bottom board 102 from front to back, along the inside of frame 201 and above mesh screen 203. One adapter 901 is fitted along each left and right side as shown in FIG. 10. Adapter 901 and bottom board 102 are so designed such that only a single adapter 901 design is required for either the left or right side of bottom board 102. Once 2 adapters 901 are fitted into bottom board 102, an 8-frame hive body 1103 can fit onto bottom board 102 with the longer edges of hive body 1103 sitting atop adapters 901 and on rear side of frame 201. When adapters 901 are installed, the top surfaces of adapters 901 and the top surface of frame 201 are flush with each other.

Adapters 901 include a flange 904 the defines holes 902. Holes 902 mate with security pins 204 on bottom board 102. Flange 904 is offset from top surface of adapter 901 to ensure the flush surface between adapters 901 and frame 102.

Adapter 901 includes adapter security pins 903 to stabilize the 8-frame hive body 1103 and prevent shifting. As described above, without adapters 901, a 10-frame hive body 103 fits on frame 201. Adapter security pins 903 are positioned such that inside corners of 8-frame hive body 1103 align with adapter security pins 903. The standard inside dimensions of a 10-frame hive body 103 is 18⅜ inches by 14¼ inches; and, the standard inside dimensions of an 8-frame hive body 1103 is 18⅜ inches by 12¼ inches. Other sizes of hive bodies are contemplated.

With the use of the bottom board system and adapters 901, an 8-frame hive can fit onto a 10-frame bottom board. This eliminates the requirement for an additional bottom board mold to accommodate these narrow 8-frame hive boxes that account for about 20% of the market. All of the other units are the market are made specifically for either 8-frame or 10-frame which means double the inventory for dealers. Unlike conventional equipment the bee hive bottom board system allows beekeepers to switch between 8-frame and 10-frame equipment quickly, easily and inexpensively.

The bottom board system according to the present disclosure offers improved drainage, a more secure attachment for hive boxes, recesses to accommodate reversible mouse guards/entrance reducer and robbing screen, an embedded stainless steel mesh that eliminates all fasteners, notches for hive straps, molded in supports for a slide in inspection board or tray, radiused inner corners to deter small hive beetles and holes for use with hive stands, plus adapters to convert it between 8-frame and 10-frame. In addition, the engineering grade plastic will outlast wood and includes recesses to accommodate reinforcing ribs for added strength.

The bottom board system according to the present disclosure takes conventional bottom board design to a new level by integrating many design elements that are not possible with conventional designs; many of these are part of an Integrated Pest Management (IPM) system to reduce the amount of chemicals used to control hive problems. No other bottom board system accommodates different width hives with a simple spacer device to create a universal design and none angle the internal horizontal surfaces downward to drain water or eliminate sharp inside corners to control small hive beetles, and/or accommodate a robbing screen that secures a bee hive from would-be scavengers and/or invaders and unwanted transmission of mites and/or viruses and/or other diseases.

Components of the system can be fabricated from materials suitable for outdoor environments, including, but not limited to, metal(s), plastic(s), wood(s), combinations thereof, etc. Various components of the system may be fabricated from material composites, including the above materials, to achieve various desired characteristics such as strength, rigidity, elasticity, flexibility, compliance, performance, and durability. The components of the system, individually or collectively, may also be fabricated from a heterogeneous material such as a combination of two or more of the above-described materials.

Where this application has listed the steps of a method or procedure in a specific order, it may be possible, or even expedient in certain circumstances, to change the order in which some steps are performed, and it is intended that the particular steps of the method or procedure claim set forth here below not be construed as being order-specific unless such order specificity is expressly stated in the claims.

While the preferred embodiments of the devices and methods have been described in reference to the environment in which they were developed, they are merely illustrative of the principles of the inventions. Modification or combinations of the above-described assemblies, other embodiments, configurations, and methods for carrying out the invention, and variations of aspects of the invention that are obvious to those of skill in the art are intended to be within the scope of the claims.

What is claimed is:

1. A bee hive bottom board system for receiving a hive body having an inside length and inside width, comprising:
    a 3-sided rectangular frame having a right side, a left side and a rear side, the 3-sided rectangular frame defining a right rear inside corner and a left rear inside corner, each side having a top surface and an inner surface, the top surface defining a frame plane;
    a drain edge positioned within the frame about the inner surface, the drain edge having a top surface defining a drain edge plane set below the frame plane;
    a first security pin positioned approximate to one of the right rear inside corner and the left rear inside corner, said first security pin extending above the top surface of the frame;
    a second security pin positioned diagonally across the frame from the first security pin and at a distance from one of the right rear inside corner and the left rear inside corner approximately equal to the inside length of the hive body, said second security pin extending above the top surface of the frame;
    a third security pin positioned approximate to another of the right rear inside corner and the left rear inside corner, said third security pin extending above the top surface of the frame;
    a fourth security pin positioned diagonally across the frame from the third security pin and at a distance from another of the right rear inside corner and the left rear inside corner approximately equal to the inside length of the hive body, said fourth security pin extending above the top surface of the frame; and
    an adapter having a support component and a flange component, the flange component mateable with one of the first and third security pins or the second and fourth security pins, the adapter having an edge abutting the inner surface such that a top surface of the support component is in the frame plane,
    wherein a hive body of a first size is positionable on at least a portion of the top surface of the frame, and inside and opposite corners of the hive body mate with the security pins.

2. The bee hive bottom board system of claim 1, further comprising:
    first and second adapter security pins positioned about ends of the support component, said first and second adapter pins extending above a plane of the top surface of the frame and mateable with the inside corners of the hive body.

3. The bee hive bottom board system of claim 1, further comprising:
    a robbing screen positionable across a front edge of the drain edge and within an inside of the frame.

4. The bee hive bottom board system of claim 3, wherein the robbing screen further comprises:
    a mounting edge defining a first plane;
    a front surface defining a second plane substantially parallel to the first plane; and
    a connecting edge connecting the mounting edge and the front surface, said connecting edge defining a plane substantially perpendicular to the first and second planes, said connecting edge defining at least one hive access port positioned on an upper surface of the connecting edge.

5. The bee hive bottom board system of claim 4, further comprising:
    an access port door having a connector component for rotatably connecting the access port door to the connecting edge and configured to open and close access to the hive through the at least one hive access port.

6. The bee hive bottom board system of claim 1, wherein the drain edge defines an opening, the bottom board system further comprising a screen secured within the opening.

7. The bee hive bottom board system of claim 6, further comprising an inspection board removably attachable to an underside of the bottom board system, said inspection board covering said opening when attached to the bottom board.

8. The bee hive bottom board system of claim 1, further comprising:
    a plurality of reversible mouse guard entrance reducers positionable across a front edge of the drain edge, within the inside of the frame, and across an entrance to the hive body when the hive body is attached to the bottom board system.

9. A bee hive bottom board system for receiving a hive body having an inside length and inside width, comprising:

a 3-sided rectangular frame having a right side, a left side and a rear side, the 3-sided rectangular frame defining a right rear inside corner and a left rear inside corner, each side having a top surface and an inner surface, the top surface defining a frame plane;

a drain edge positioned within the frame about the inner surface, the drain edge having a top surface defining a drain edge plane set below the frame plane; and two adapters each having a support component and a flange component, the flange component of each adapter positionable along the inner surface of one of the right side and left side of the frame and mateable with the top surface of one of the right side and left side of the frame, each adapter having an edge abutting the inner surface such that a top surface of the support component is in the frame plane, wherein when mated with the frame, a top surface of each of the adapters is substantially flush with the top surface of the frame, and wherein the hive body is positionable on at least a portion of the top surface of the adapters.

10. The bee hive bottom board system of claim 9, further comprising:

four security pins, a security pin of the four security pins positioned at each of the right rear inside corner and the left rear inside corner of the frame, and a security pin of the four security pins positioned along each of the right and left sides of the frame at a distance from the pins positioned at the rear inside corners approximately equal to the inside length of the hive body; and two adapter security pins, an adapter security pin of the two adapter security pins positioned about each end of the support component, said adapter security pins extending above a plane of the top surface of the frame and mateable with the inside corners of the hive body, wherein the flange component defines two holes mateable with two of the security pins positioned along each of the right and left sides of the frame.

11. The bee hive bottom board system of claim 9, further comprising:

a robbing screen positionable across a front edge of the drain edge and within an inside of the frame.

12. The bee hive bottom board system of claim 11, wherein the robbing screen further comprises:

a mounting edge defining a first plane;

a front surface defining a second plane substantially parallel to the first plane; and a connecting edge connecting the mounting edge and the front surface, said connecting edge defining a plane substantially perpendicular to the first and second planes, said connecting edge defining at least one hive access port positioned on an upper surface of the connecting edge.

13. The bee hive bottom board system of claim 12, further comprising:

an access port door having a connector component for rotatably connecting the access port door to the connecting edge and configured to open and close access to the hive through the at least one hive access port.

14. The bee hive bottom board system of claim 13, wherein the connector component provides a resilient force to prevent unwanted movement of the access port door.

15. The bee hive bottom board system of claim 12, wherein the front surface defines a plurality of ventilation holes grouped and positioned away from the at least one hive access port.

16. A bee hive bottom board system for receiving a hive body having an inside length and inside width, comprising:

a 3-sided rectangular frame having a right side, a left side and a rear side, the 3-sided rectangular frame defining a right rear inside corner and a left rear inside corner, each side having a top surface and an inner surface, the top surface defining a frame plane;

a drain edge positioned within the frame about the inner surface, the drain edge having a top surface defining a drain edge plane set below the frame plane; and a robbing screen positionable across a front edge of the drain edge and within an inside of the frame, the robbing screen comprising:

a mounting edge defining a first plane;

a front surface defining a second plane substantially parallel to the first plane;

a connecting edge connecting the mounting edge and the front surface, said connecting edge defining a plane substantially perpendicular to the first and second planes, said connecting edge defining at least one hive access port positioned on an upper surface of the connecting edge;

an access port door having a connector component for rotatably connecting the access port door to the connecting edge and configured to open and close access to the hive body through the at least one hive access port; and two adapters each having a support component and a flange component, the flange component of each adapter positionable along the inner surface of one of the right side and left side of the frame and mateable with an upper surface of one of the right side and left side of the frame, each adapter having an edge abutting the inner surface such that a top surface of the support component is in the frame plane, wherein when mated with the frame, a top surface of each of the adapters is substantially flush with the top surface of the frame, and wherein the hive body is positionable on at least a portion of the top surface of the adapters.

17. The bee hive bottom board system of claim 16, further comprising:

four security pins, a security pin of the four security pins positioned at each of the right rear inside corner and the left rear inside corner of the frame, and a security pin of the four security pins positioned along each of the right and left sides of the frame at a distance from the pins positioned at the rear inside corners approximately equal to the inside length of the hive body; and two adapter security pins, an adapter security pin of the two adapter security pins positioned about each end of the support component, said adapter security pins extending above a plane of the top surface of the frame and mateable with the inside corners of the hive body, wherein the flange component defines two holes mateable with two of the security pins positioned along each of the right and left sides of the frame.

\* \* \* \* \*